US011868786B1

(12) United States Patent
Hung et al.

(10) Patent No.: US 11,868,786 B1
(45) Date of Patent: Jan. 9, 2024

(54) SYSTEMS AND METHODS FOR DISTRIBUTED AND PARALLELIZED EMULATION PROCESSOR CONFIGURATION

(71) Applicant: Cadence Design Systems, Inc., San Jose, CA (US)

(72) Inventors: Ngai Ngai William Hung, San Jose, CA (US); Amiya Ranjan Satapathy, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 171 days.

(21) Appl. No.: 17/576,808

(22) Filed: Jan. 14, 2022

(51) Int. Cl.
| | |
|---|---|
| *G06F 9/44* | (2018.01) |
| *G06F 9/445* | (2018.01) |
| *G06F 9/4401* | (2018.01) |
| *G06F 9/30* | (2018.01) |

(52) U.S. Cl.
CPC ...... *G06F 9/44505* (2013.01); *G06F 9/30043* (2013.01); *G06F 9/30101* (2013.01); *G06F 9/30189* (2013.01); *G06F 9/4403* (2013.01); *G06F 9/4401* (2013.01)

(58) Field of Classification Search
CPC ............. G06F 9/44505; G06F 9/30043; G06F 9/30101; G06F 9/30189; G06F 9/4403
USPC ............................................................ 713/1
See application file for complete search history.

(56) References Cited

U.S. PATENT DOCUMENTS

| | | | | |
|---|---|---|---|---|
| 6,704,895 B1* | 3/2004 | Swoboda | ....... | G01R 31/318536 714/E11.169 |
| 7,606,698 B1* | 10/2009 | Elmufdi | ................. | G06F 30/33 717/149 |
| 11,716,036 B1* | 8/2023 | Shverdin | ................ | H02N 2/043 310/317 |
| 2004/0123258 A1* | 6/2004 | Butts | ..................... | G06F 30/331 716/106 |
| 2008/0215305 A1* | 9/2008 | Bishop | ................ | G06F 12/1009 703/15 |
| 2009/0164205 A1* | 6/2009 | Sargaison | ............... | G06F 9/455 703/23 |
| 2012/0260042 A1* | 10/2012 | Henry | ................. | G06F 9/30174 711/E12.017 |
| 2012/0323549 A1* | 12/2012 | Bashteen | ................ | G06F 30/30 711/119 |
| 2013/0311806 A1* | 11/2013 | Felch | .................... | G06F 9/3851 713/322 |
| 2016/0378545 A1* | 12/2016 | Ho | ........................ | G06F 9/4843 718/107 |
| 2018/0253302 A1* | 9/2018 | Gschwind | ........... | G06F 9/30032 |
| 2018/0349252 A1* | 12/2018 | Rodriguez Hernandez | ................. | G06F 16/50 |

(Continued)

*Primary Examiner* — Volvick Derose
(74) *Attorney, Agent, or Firm* — Foley & Lardner LLP

(57) ABSTRACT

Implementations may include a method of accelerated modification of an emulation processor system, by loading, by a first emulation processor, a first portion of processor instructions into one or more registers of the first emulation processor, in response to a selection of a first programming mode associated with the first emulation processor, and loading, by a second emulation processor operatively coupled with the first emulation processor, a second portion of the processor instructions into one or more registers of the second emulation processor, in response to a selection of a first programming mode associated with the second emulation processor.

18 Claims, 10 Drawing Sheets

(56) References Cited

U.S. PATENT DOCUMENTS

2022/0091907 A1\* 3/2022 Fu .............................. G06F 9/52

\* cited by examiner

SYSTEMS AND METHODS FOR DISTRIBUTED AND PARALLELIZED EMULATION PROCESSOR CONFIGURATION

TECHNICAL FIELD

The present implementations relate generally to emulation hardware, and more particularly to distributed and parallelized emulation processor configuration.

BACKGROUND

Computing hardware is increasingly complex, and contributes to increasing demand for testing and simulation of computing hardware. As computing hardware increases in complexity, cost and time required to develop and test prototype hardware increases rapidly, causing significant delay and wasted resources. Conventional systems cannot effectively and efficiently test and validate computing hardware with sufficient speed and granularity to ensure correct and predictable operation of complex computing hardware.

SUMMARY

Embodiments described herein are directed to hardware-accelerated configuration of multiple emulation processors to generate a rapid hardware-level configuration of an emulation system of computing hardware. The emulation system may thus advantageously modify itself at a hardware level to achieve a significant decrease in time required to configure at least one or more of the emulation processors of the emulation system. The emulator system may modify the contents of one or more registers of one or more emulation processors with instructions executable directly by one or more emulation processors of the emulation system or one or more controllers of the emulation processors. Because the emulation system may include a significant number of emulation processors, the emulation system may instruct the emulation processors to self-program or self-configure across at least a portion of the emulation system in parallel.

Embodiments described herein may provide several advantages, including at least the advantages discussed herein. First, an emulation system may complete an efficient bulk data transfer of instructions by a communication interface, to reduce time required to transfer instructions from a host computer to individual emulation processors. Second, each emulation processor and emulation controller may execute its own tasks in parallel with respect to portions of the bulk-transferred instructions to registers or the like of each of the emulation processors. Third, the emulation processors and emulation controllers may obtain instructions respective to each processor by a processor level communication channel, independently of an external communication interface or an external communication protocol. The emulation processors may thus obtain their instructions and modify their own registers with operations native to the emulation processor to significantly increase speed of configuration of the hardware of each emulation processor. Thus, a technological solution for distributed and parallelized emulation processor configuration is provided.

In one embodiment, a method of accelerated modification of an emulation processor system, including loading, a portion of data to a memory of a first emulation processor, where the data contains information about a list of sequential updates to one or more hardware states of the first emulation processor and an embedded controller in the first emulation processor which takes the above data and performs corresponding updates to remaining states or registers of the first emulation processor, and loading, in parallel, a second portion of the data to a memory of a second emulation processor operatively coupled with the first emulation processor, where the data contains information about a list of sequential updates to the hardware states of the second emulation processor, and an embedded controller in the second emulation processor which takes the second portion of the data and performs the corresponding updates to remaining states or registers of the second emulation processor, and loading, in parallel, a third portion of the data to the memory of other emulation processors of the emulation processor system that contains embedded controllers performing their own state updates.

Portions of the data for each of the emulation processors can contain information to extract specific states or register values from the corresponding emulation processor, which is performed by the embedded controller, and subsequent updates contained in a respective one of the portions of the data can depend on conditional or logical evaluation of extracted results.

The method may include loading a portion of data to a memory of a processor or controller operatively coupled with the first, second or other emulation processors of the emulation system, where the processor or controller uses the information contained in the portion of data to update states or register values of a different processor operable at least in emulation or communication, that is operatively coupled with or integrated in the emulation system.

The method may include loading, a fourth portion of the data to a memory of a system processor or system controller that is not operatively coupled with any of the first, second or other emulation processors of the same emulation system, where the system processor or system controller will use the information contained in the fourth portion of data to update states or register values of a different processor operable at least in emulation or communication, that is operatively coupled with the first, second or other emulation processors in the emulation system.

The method may include dividing a corresponding portion of the data for each of the processors into sequential blocks, where all blocks are loaded together to respective processors, the blocks being processed by the embedded controller in sequential order, and at the end of each block, processors or controllers wait for all other operatively coupled processors or controllers to reach the end of the respective block of their own, which is a synchronization point.

The method may include operating an emulation host computer that initiates the loading of data to emulation processors as a master to confirm the synchronization at the end of the blocks for all operatively coupled processors, and broadcasting by the emulation host computer a message to all operatively coupled processors to process the subsequent block.

The method may include generating the portions of the data for all operatively coupled emulation processors of this emulation job by the compiler during compile time, and not during runtime.

In another embodiment, a method of accelerated modification of an emulation processor system may include loading, by a first emulation processor, a first portion of processor instructions into one or more registers of the first emulation processor, in response to a selection of a first programming mode associated with the first emulation processor, and loading, by a second emulation processor operatively coupled with the first emulation processor, a second portion of the processor instructions into one or more registers of the second emulation processor, in response to a selection of a first programming mode associated with the second emulation processor.

The method may include extracting, by a controller, the second portion of the processor instructions from a processor memory of the first emulation processor, in response to the selection of the first programming mode associated with the second emulation processor.

The method may include extracting, by the controller, a third portion of the processor instructions from a processor memory of a third emulation processor, in response to a selection of a first programming mode associated with the third emulation processor.

The method may include loading, by a fourth emulation processor operatively coupled with the third emulation processor, the third portion of the processor instructions into one or more registers of the fourth emulation processor, in response to a selection of a first programming mode associated with the fourth emulation processor.

The method may include transmitting, by a first communication channel of a communication interface operatively coupled to the first emulation processor, the processor instructions to the processor memory.

The method may include loading, by a system processor operatively coupled with at least one of the first emulation processor and the second emulation processor, at least the first portion of the processor instructions into the registers of the first emulation processor, in response to a selection of a second programming mode associated with the first emulation processor.

The method may include loading, by the system processor, at least the second portion of the processor instructions into the registers of the second emulation processor, in response to a selection of a second programming mode associated with the second emulation processor.

The method may include at least one of a first programming mode and a second programming mode associated with one or more of the emulation processor, the emulation coprocessor, and a processor array including at least one of the emulation processor and the emulation coprocessor.

The method may include synchronizing, based on a dependency of the second portion of processor instructions on the first portion of processor instruction, an order of the loading the first portion of processor instructions and the loading the second portion of processor instructions.

In another embodiment, an apparatus may include a first emulation processor including one or more first registers and operable to load a first portion of processor instructions into the first registers, in response to a selection of a first programming mode associated with the first emulation processor, and a second emulation processor operatively coupled with the first emulation processor and including one or more second registers, the second emulation processor being operable to load a second portion of the processor instructions into the second registers, in response to a selection of a first programming mode associated with the second emulation processor.

The apparatus may include a controller operatively coupled with the second emulation processor and operable to extract the second portion of the processor instructions from a first processor memory of the first emulation processor, in response to the selection of the first programming mode associated with the second emulation processor.

The apparatus may include a third emulation processor including a second processor memory and operatively coupled with the controller, where the controller is further operable to extract a third portion of the processor instructions from the second processor memory, in response to a selection of a first programming mode associated with the third emulation processor.

The apparatus may include a fourth emulation processor including one or more third registers and operatively coupled with the third emulation processor, the fourth emulation processor being operable to load the third portion of the processor instructions into the third registers, in response to a selection of a first programming mode associated with the fourth emulation processor.

The apparatus may include a communication interface including a first communication channel and operatively coupled to the first emulation processor, the communication interface operable to transmit the processor instructions to the first processor memory by the first communication channel.

The apparatus may include a system processor operatively coupled with at least one of the first emulation processor and the second emulation processor, and operable to load at least the first portion of the processor instructions into the first registers, in response to a selection of a second programming mode associated with the first emulation processor.

The apparatus may include a system processor further operable to load at least the second portion of the processor instructions into the registers of the second emulation processor, in response to a selection of a second programming mode associated with the second emulation processor.

The apparatus may include the first emulation processor and the second emulation processor are further configured to synchronize, based on a dependency of the second portion of processor instructions on the first portion of processor instruction, an order of the loading the first portion of processor instructions and the loading the second portion of processor instructions.

In yet another embodiment, a system of accelerated modification of an emulation processor system may include a first emulation processor including one or more first registers and operable to load a first portion of processor instructions into the first registers, in response to a selection of a first programming mode associated with the first emulation processor, a second emulation processor operatively coupled with the first emulation processor and including one or more second registers, the second emulation processor being operable to load a second portion of the processor instructions into the second registers, in response to a selection of a first programming mode associated with the second emulation processor, a controller operatively coupled with the second emulation processor and operable to extract the second portion of the processor instructions from a first processor memory of the first emulation processor, in response to the selection of the first programming mode associated with the second emulation processor, and a system processor operatively coupled with at least one of the first emulation processor and the second emulation processor, operable to load at least the first portion of the processor instructions into the first registers, in response to a selection of a second programming mode associated with the first emulation processor, and operable to load at least the second portion of the processor instructions into the registers of the second emulation processor, in response to a selection of a second programming mode associated with the second emulation processor.

The system may include a system memory operatively coupled with the system processor, and a communication interface including a first communication channel and a second communication channel, and operatively coupled to the first emulation processor, the system processor, and the system memory.

The system may include the communication interface is operable to transmit the processor instructions to the first processor memory by the first communication channel, in response to the selection of the first programming mode associated with the first emulation processor, and the communication interface is operable to transmit the processor instructions to the system memory by the second communication channel, in response to the selection of the second programming mode associated with the first emulation processor.

BRIEF DESCRIPTION OF THE DRAWINGS

These and other aspects and features of the present implementations will become apparent to those ordinarily skilled in the art upon review of the following description of specific implementations in conjunction with the accompanying figures, wherein.

DETAILED DESCRIPTION

Figure 1:
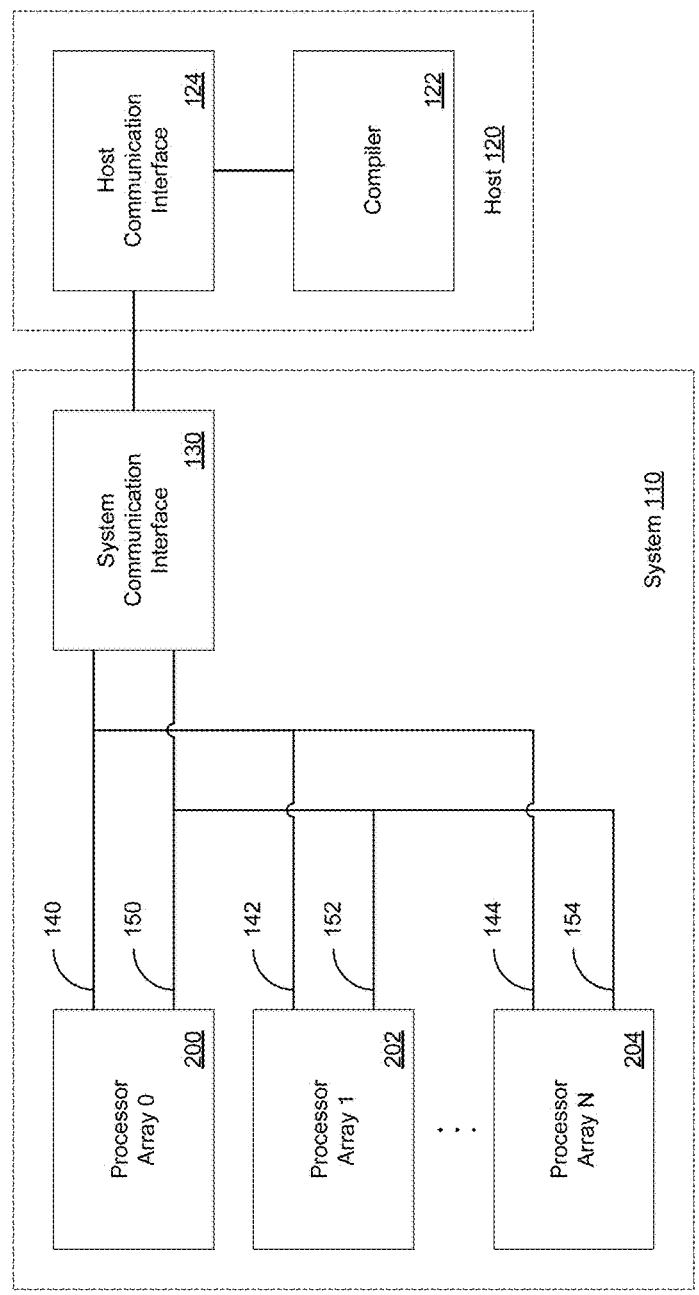
FIG. 1 illustrates an emulation system, according to an embodiment.

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations may be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but may include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

A typical task in emulation is to download a design including an emulation configuration for one or more emulation processors from a host computer to an emulator system. For a processor-based emulator, a "download" task of emulation instructions from the host to the emulator system may be time consuming and may introduce significant delays into validation of computing hardware. Specifically, a host computer software may program configure the emulation processors in the emulator system by reading and writing many addresses for each emulation processors. Each address may correspond to registers or hardware settings in each emulation processor, resulting in a significant number of instructions executed for each of a significant number of emulation processors. In addition instructions executed on emulation processors are difficult to process by an external device or centrally, because instructions sets for each emulation processor, and for pairs and array of emulation processors, may frequently be noncontiguous with respect to addresses. Since there may be thousands or millions of such reading and writing operations, it takes substantial time to program each emulation processor.

Embodiments described herein are directed to systems including support for programming emulation processors in parallel and in a distributed fashion, across multiple groups of emulation processors and physical portions of an emulation system. An emulation system may include multiple emulation processors arranged in groups by emulation processor pairs, arrays of emulation processor pairs, and physical portions including arrays of emulation processor pairs. Each emulation processor may obtain or receive, for example, one or more instructions operable to configure the emulation processors or modify one or more portion of the emulation processors. The emulation system may include a communication interface to transmit instructions directly executable by the emulations processors to memory locations of the emulation processors, to efficiently transmit execution-ready instructions to a large number of emulation processors. The emulation system may also make available processor instructions to emulation processors by transmitting instructions executable by various emulation processors to a memory of an emulation processor paired with a particular emulation processor. Thus, embodiments may achieve configuration of emulation processors at advantageously higher speed by loading instructions to memory areas accessible by emulation processors at high-speed processor-level memory locations and by processor-level communication channels.

An emulation system that may provide a chip-level programming mode and board-level programming mode. In the chip-level programming mode, the emulation system may instruct various emulation processors to obtain their own configurations from an external memory or a memory of another emulation processor. In the board-level programming mode, various emulation processors may obtain their configurations directly to their respective memories, registers, or the like. Instructions for configuration of various emulation processors may be generated at a host device including or associated with a compiler system. The instructions may be transferred by a local communication interface or a remote communication interface, for example, to a system memory of the emulation system. The emulation system, the emulation processors, and the controllers of the emulation processors may independently and concurrently obtain various portions of the instructions associated with their corresponding processors or controllers, and may program, configure, or modify various emulation processors in accordance with the instructions for each specific emulation processor. Present implementations may also support execution of instructions by emulation processors in a synchronized manner. Synchronized instructions may include ordering of instructions or selective execution of instructions based on initialization dependencies or run-time dependencies associated with the emulation system or the configuration of the emulation system, for example.

As one example, ordering of instructions can include or be responsive to an order of transferring data to one or more emulation processors. The emulation processors can be configured to receive multiple portions of data, wherein the data is divided into portions, or "chunks" prior to transmission to the emulation processors. As one example, portions or chunks can be generated based on dependencies, in which any data having a dependency on an earlier action can be assigned to a subsequent or later portion or chunk than data on which it has a dependency. The emulation processors can then receive a subset of the multiple portions of the transfer. The transfer can include a transfer of one portion or one chunk at a time. As one example, a synchronization associated with the emulation processors can include introducing a delayed transfer of one or more subsequent portions or chunks until the emulation processors have received all data from the prior portion or chunk. As another example, a synchronization associated with the emulation processors can include introducing a delayed transfer of one or more subsequent portions or chunks until the emulation processors have loaded or executed all data from the prior portion or chunk. The emulation processors can reach a synchronization point indicating or communicating, for example, completion of tasks associated with the portion or chunk. After reaching the synchronization point, one or more subsequent portions or chunks can be transferred, and so on.

Present implementations can include instructions sets governing many aspects of individual and collective execution of emulation processors and systems. As one example, instructions or data as discussed herein can encapsulate programming or configuration details of the emulation chip as a bulk of data. It is to be understood that the examples of instructions or data discussed herein by way of example are not limiting to the scope of instructions or data in accordance with present implementations. For example, instructions or data can include an instruction set architecture to perform operations including one or more of the following operations. First, operations can include identifying or defining a set of logical registers for the instruction set. Second, operations can include read operations including addressing, controlling size of data to be read, and selecting particular registers to store particular results. Third, operations can include write operations including addressing, controlling size of data to be written, defining bitmasks for bits to be written, and selecting data or logical registers to receive results of the write operation. Fourth, operations can include logical decisions. Logical decision can include, but are not limited to, comparison operations, logical AND, logical OR, and logical negation. Fifth, operations can include decision flow control. As one example, decision flow control can include if-then, if-then-else, or select-case branching operations based on logical decisions. Sixth, operations can include instructions to control synchronization with the host computer from the emulation system. As one example, a state machine or preprogrammed hardware routine can implement the operations discussed above.

FIG. 1 illustrates an emulation system, in accordance with present implementations. As illustrated by way of example in FIG. 1, an example emulation system 100 may include a system 110 and a host 120. The system 110 may be a first computing device or a collection of computing devices, and may include a server device, rack-mount server device, datacenter, desktop, or laptop, device, for example. The host 120 may be a second computing device and may include a server device, rack-mount server device, datacenter, desktop, or laptop, device, for example. As one example, the system 110 may include a rack-mount server, and the host 120 may include a desktop or laptop computer. The emulation system may also include only the system 110 and be operatively coupled or couplable with the host 120. The system 110 may include a system communication interface 130, direct programming communication channels 140, 142 and 144, system programming channels 150, 152 and 154, and processor arrays 200, 202 and 204. The host 120 may include a compiler 122 and a host communication interface 124.

The system communication interface 130 may communicatively couple the system 110 and the host 120, and may be integrated with the system 110. The system communication interface 130 may communicate one or more instructions, signals, conditions, states, or the like between one or more of the system 110 and the host 120. The system communication interface 130 may include one or more digital, analog, or like communication channels, lines, traces, or the like. As one example, the system communication interface 130 may include at least one high-bandwidth, serial or parallel communication line among multiple communication lines of a communication interface. The system communication interface 130 may include one or more wireless communication devices, systems, protocols, interfaces, or the like. The system communication interface 130 may include one or more logical or electronic devices including but not limited to integrated circuits, logic gates, flip flops, gate arrays, programmable gate arrays, and the like. The system communication interface 130 may include ones or more telecommunication devices including but not limited to antennas, transceivers, packetizers, and wired interface ports.

The direct programming communication channels 140, 142 and 144 may communicatively couple the system communication interface 130 respectively to the processor arrays 200, 202 and 204. The direct programming communication channels 140, 142 and 144 may communicate one or more instructions, signals, conditions, states, or the like between one or more of the system communication interface 130 and respectively ones of the processor arrays 200, 202 and 204. In some implementations, the direct programming communication channels 140, 142 and 144 include one or more digital, analog, or like communication channels, lines, traces, or the like. As one example, the direct programming communication channels 140, 142 and 144 include at least one serial or parallel communication line among multiple communication lines of a communication interface. The system programming channels 150, 152 and 154 may communicatively couple the system communication interface 130 respectively to the processor arrays 200, 202 and 204, and may correspond at least partially in one or more of structure and operation to the direct programming communication channels 140, 142 and 144. It is to be understood that the direct programming communication channels 140, 142 and 144 and the system programming channels 150, 152 and 154 may be integrated within a single communication bus or the like, or may each be included in separate or distinct communication busses or the like.

The processor arrays 200, 202 and 204 may include one or more emulation processors and may further include one or more controllers operable with the emulation processors. Each processor array may include multiple emulation processors arranged in multiple groupings. Emulation processor may be paired with one another in accordance with a processor architecture directed to executing hardware emulation at a hardware level by the emulation processors. It is to be understood that the emulation processor architecture is distinct from a general purpose computer and achieves the particular technological solution to the technical problem discussed herein.

As one example, 16 emulation processors may be arranged into 8 pairs, per logic drawer board. Each of the processor arrays 200, 202 and 204 may correspond to a single logic drawer board. Further, 6 logic drawer boards may be grouped into a cluster of boards, and 3 clusters may be grouped into a single rack. The system 110 may include any number of racks, and is not limited to the numbers of emulation processors, emulation processor pairs, logic drawer boards, clusters discussed above. The programming communication channels 140, 142,144, 150, 152 and 154 may advantageously improve programming of the emulator chips, at least because one host handling programming of and transmission of instructions to thousands of emulation processors is costly, even using multi-threading, due at least in part to the limited number of cores available to the host.

The compiler 122 may include one or more electronic components to generate instructions compatible with one or more emulation processors of the processor arrays 200, 202 and 204. The compiler 122 may include an integrated development environment ("IDE") or the like to convert source instructions written in one or more high-level languages, pseudocode languages, or the like, to instructions compatible with one or more emulation processors of the processor arrays 200, 202 and 204. The compiler 122 may include one or more graphical user interfaces and one or more command line interfaces. The host communication interface 124 may communicatively couple the system 110 and the host 120, and may be integrated with the host 120. The host communication interface 124 may correspond at least partially in one or more of structure and operation to the system communication interface 130.

Figure 2A:
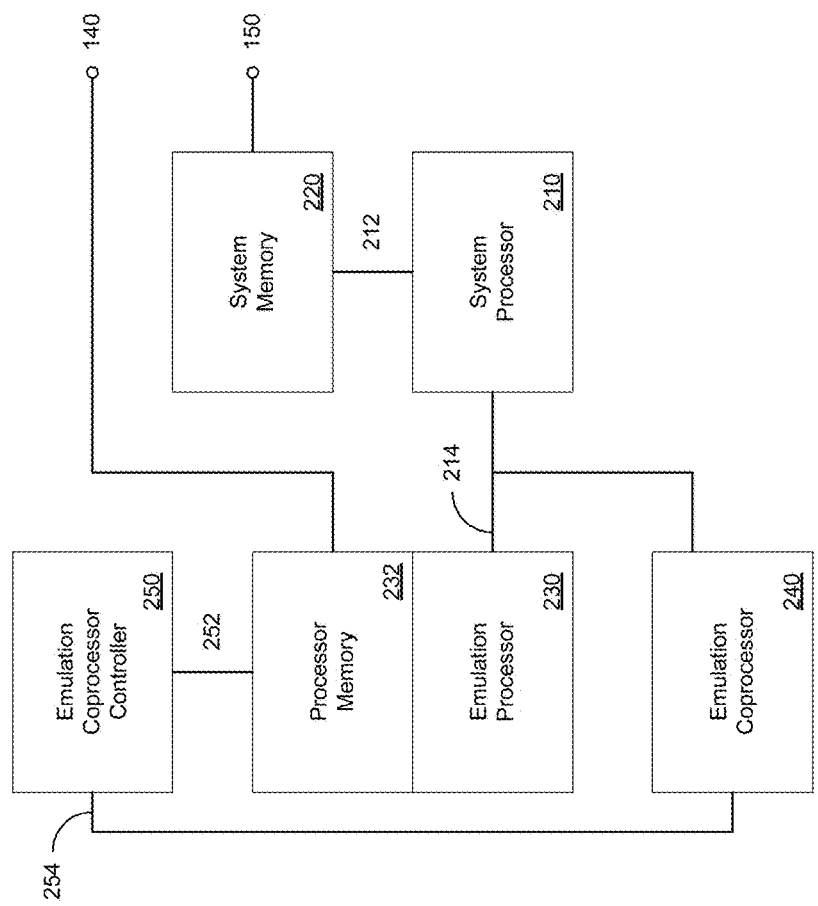
FIG. 2A illustrates a first emulation processor array, according to an embodiment.

FIG. 2A illustrates a first emulation processor array, in accordance with present implementations. As illustrated by way of example in FIG. 2A, an example processor array 200 may include a system processor 210, a first processor channel 212, a second processor channel 214, a system memory 220, an emulation processor 230, a processor memory 232, an emulation coprocessor 240, an emulation coprocessor controller 250, a first controller channel 252, and a second controller channel 254. The processor array may be operatively coupled with the direct programming communication channel 140 at the processor memory 232, and the system programming communication channel 150 at the system memory 220. It is to be understood that the processor array 202 and 204 may correspond at least partially in one or more of structure and operation to the processor array 200, and may respectively be coupled to the programming communication channels 142 and 152, and 144 and 154.

The system processor 210 may execute one or more instructions associated with the system 110 or the processor array 200. The system processor 210 may include an electronic processor, an integrated circuit, or the like including one or more of digital logic, analog logic, digital sensors, analog sensors, communication buses, volatile memory, nonvolatile memory, and the like. The system processor 210 may include, but is not limited to, at least one microcontroller unit (MCU), microprocessor unit (MPU), central processing unit (CPU), graphics processing unit (GPU), physics processing unit (PPU), embedded controller (EC), or the like. The system processor 210 may include a memory operable to store or storing one or more instructions for operating components of the system processor 210 and operating components operably coupled to the system processor 210. The one or more instructions may include at least one of firmware, software, hardware, operating systems, embedded operating systems, and the like. The system processor 210 or the processor array 200 generally may include at least one communication bus controller to effect communication between the system processor 210 and the other elements of the system 110 or the processor array 210. The first processor channel 212 may operatively couple the system processor 210 with the system memory 220. The second processor channel 214 may operatively couple the system processor 210 with one or more of the emulation processor 230 and the emulation coprocessor 240. Each of the first processor channel 212 and the second processor channel 214 may include one or more digital, analog, or like communication channels, lines, traces, or the like.

The system memory 220 may store data associated with the system 110 and the processor array 200. The system memory 220 may include one or more hardware memory devices to store binary data, digital data, or the like. The system memory 220 may include one or more electrical components, electronic components, programmable electronic components, reprogrammable electronic components, integrated circuits, semiconductor devices, flip flops, arithmetic units, or the like. The system memory 220 may include at least one of a non-volatile memory device, a solid-state memory device, a flash memory device, and a NAND memory device. The system memory 220 may include one or more addressable memory regions disposed on one or more physical memory arrays. A physical memory array may include a NAND gate array disposed on, for example, at least one of a particular semiconductor device, integrated circuit device, and printed circuit board device.

The emulation processor 230 may execute one or more emulation instructions associated with corresponding parameters of a computing device or hardware system, for example. The emulation processor 230 may include an electronic processor, an integrated circuit, or the like including one or more of digital logic, analog logic, digital sensors, analog sensors, communication buses, volatile memory, nonvolatile memory, and the like. The emulation processor 230 may include one or more emulation cores, emulation registers, or emulation caches, for example, to execute the emulation instructions and perform a hardware-level emulation of a particular computing device or hardware system defined by the emulation instructions. The emulation processor 230 or the processor array 200 generally may include at least one communication bus controller to effect communication between the emulation processor 230 and the other elements of the processor array 200. The emulation processor 230 may include the processor memory 232.

The processor memory 232 may store one or more instructions for operating components of the emulation processor 230 and operating components operably coupled to the emulation processor 230. The one or more instructions may include at least one of firmware, software, hardware, operating systems, embedded operating systems, emulation instructions and the like. The processor memory 232 may receive emulation instructions from the programming communication channel 140 and may store the emulation instructions at one or more memory locations of the processor memory 232. The processor memory 232 may include one or more processor caches, or processor memory blocks, for example, that may operate at higher throughput, bandwidth, or the like, than the system memory 220. As one example, the processor memory 232 may include at least one DDR memory.

The emulation coprocessor 240 may execute one or more emulation instructions associated with corresponding parameters of a computing device or hardware system, for example. The emulation processor 230 may communicate with the emulation processor 230 to perform operations concurrently with, complementary to, or supplementary to the operations executed by the emulation processor 230. As one example, the emulation coprocessor 240 may perform a portion of a computational operation or set of operations as designated by the emulation processor 230, and may return one or more results of the portion of the computational operation to the emulation processor 230. The emulation coprocessor 240 may include an electronic processor, an integrated circuit, or the like including one or more of digital logic, analog logic, digital sensors, analog sensors, communication buses, volatile memory, nonvolatile memory, and the like. The emulation coprocessor 240 may include one or more emulation cores, emulation registers, or emulation caches, for example, to execute the emulation instructions and perform a hardware-level emulation of a particular computing device or hardware system defined by the emulation instructions. The emulation coprocessor 240 or the processor array 200 generally may include at least one communication bus controller to effect communication between the emulation coprocessor 240 and the other elements of the processor array 200.

The emulation coprocessor controller 250 may execute one or more instructions associated with the emulation coprocessor 240, and may transmit or selectively transmit, for example, emulation instructions to the emulation coprocessor 240. The emulation coprocessor controller 250 may transmit emulation instructions to the emulation coprocessor 240 associated specifically with the emulation coprocessor 240. The emulation coprocessor controller 250 may include an electronic processor, an integrated circuit, or the like including one or more of digital logic, analog logic, digital sensors, analog sensors, communication buses, volatile memory, nonvolatile memory, and the like. The emulation coprocessor controller 250 may include, but is not limited to, at least one microcontroller unit (MCU), microprocessor unit (MPU), central processing unit (CPU), graphics processing unit (GPU), physics processing unit (PPU), embedded controller (EC), or the like. The emulation coprocessor controller 250 may include a memory operable to store or storing one or more instructions for operating components of the emulation coprocessor controller 250 and operating components operably coupled to the emulation coprocessor controller 250. The one or more instructions may include at least one of firmware, software, hardware, operating systems, embedded operating systems, and the like. The emulation coprocessor controller 250 or the processor array 200 generally may include at least one communication bus controller to effect communication between the emulation coprocessor controller 250 and the other elements of the processor array 200.

The first controller channel 252 may operatively couple the emulation coprocessor controller 250 with the processor memory 232. The emulation coprocessor controller 250 may obtain instructions associated with the emulation coprocessor 240 from the processor memory 232 by the first controller channel 252. The second controller channel 254 may operatively couple the emulation coprocessor controller 250 with the emulation coprocessor 240. The emulation coprocessor controller 250 may transmit instructions associated with the emulation coprocessor 240 to the emulation coprocessor 240 by the second controller channel 254.

Figure 2B:
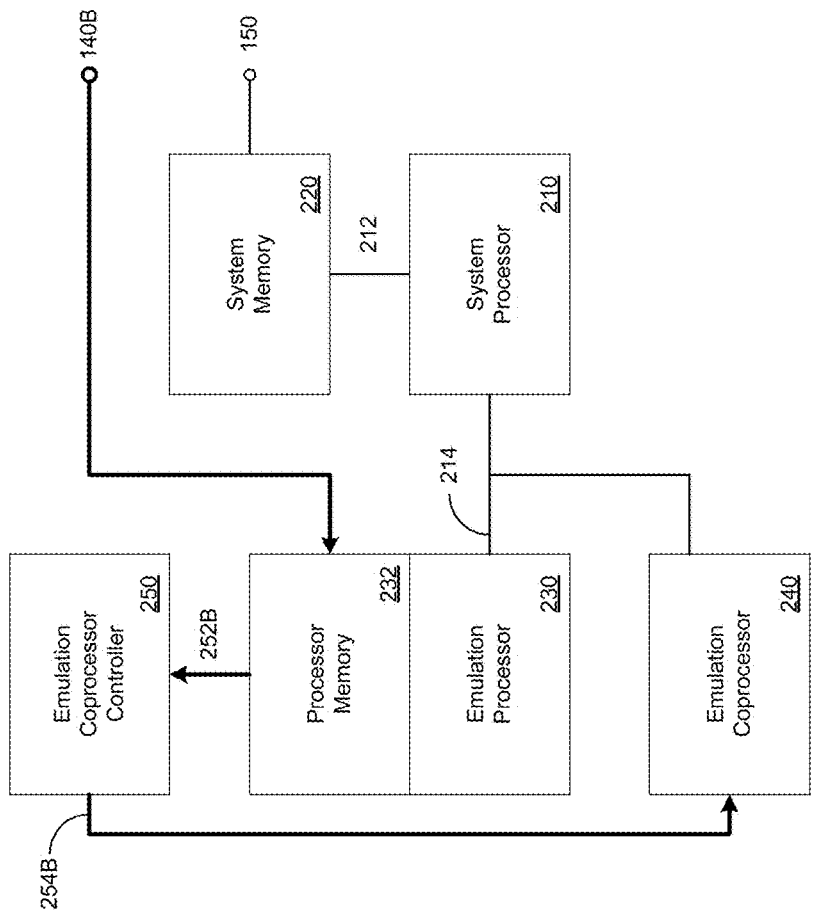
FIG. 2B illustrates the first emulation processor array in a first programming mode, further to FIG. 2A, according to an embodiment.

FIG. 2B illustrates the first emulation processor array in a first programming mode, further to FIG. 2A. As illustrated by way of example in FIG. 2B, an example processor array 200A in a first programming mode may include the system processor 210, the first processor channel 212, the second processor channel 214, the system memory 220, the emulation processor 230, the processor memory 232, the emulation coprocessor 240, the emulation coprocessor controller 250, the first controller channel in an operating state 252B, and the second controller channel in an operating state 254B. The processor array 200B may be operatively coupled with the direct programming communication channel in an operating state 140B at the processor memory 232, and the system programming communication channel 150 at the system memory 220.

The direct programming communication channel 140B may transmit one or more emulation instructions associated with one or more of the emulation processor 230 and the emulation coprocessor 240. The direct programming communication channel 140B may transmit the emulation instructions for one or more of the emulation processor 230 and the emulation coprocessor 240 to the processor memory 232. The emulation instructions transmitted to the processor memory 232 may correspond to emulation instructions compatible with execution by the emulation processor 230 and the emulation coprocessor 240. Thus, the direct programming communication channel 140B may transmit to the processor memory 232 of the emulation processor 230 emulation instructions for both the emulation processor 230 and the emulation coprocessor 240. The emulation instructions at the processor memory 232 may be executable specifically by the particular emulation processor 230 and the emulation coprocessor 240. Thus, the processor memory 232 may receive emulation instructions tailored to the emulation processor 230 and the emulation coprocessor 240. The emulation processor 230 may obtain a portion of the emulation instructions associated with the emulation processor 230, and may execute or selectively execute a self-configuration of the devices, registers, caches, and the like, for example, of the emulation processor 230, by executing the portion of the emulation instructions associated with the emulation processor 230 directly from the processor memory 230.

The first controller channel 252B may transmit a portion of emulation instructions associated with the emulation coprocessor 240. The first controller channel 252B may transmit the emulation instructions for the emulation coprocessor 240 to the emulation coprocessor controller 250. The emulation instructions transmitted to the emulation coprocessor controller 250 may correspond to emulation instructions compatible with execution by the emulation coprocessor 240. Thus, the first controller channel 252B may transmit to the emulation coprocessor controller 250 emulation instructions specifically for the emulation coprocessor 240. Thus, the emulation coprocessor controller 250 may receive emulation instructions tailored to the emulation coprocessor 240. The emulation coprocessor controller 250 may also transmit subsets of the portion of the emulation instructions for the emulation coprocessor 240 based on one or more synchronization dependencies. As one example, the emulation coprocessor controller 250 may transmit emulation instructions to load particular registers of the emulation coprocessor 240 after transmitting instructions to flush those registers. As another example, the emulation coprocessor controller 250 may transmit emulation instructions sequentially or conditionally based on emulation instructions selectively transmitted to, or selectively executed by the emulation processor 230.

The second controller channel 254B may transmit the emulation instructions associated with the emulation coprocessor 240. The second controller channel 254B may transmit the emulation instructions for the emulation coprocessor 240 to the emulation coprocessor 240. The emulation coprocessor 240 may obtain a portion of the emulation instructions associated with the emulation coprocessor 240 and may execute a self-configuration of the devices, registers, caches, and the like, for example, of the emulation coprocessor 240, by executing the portion of the emulation instructions associated with the emulation coprocessor 240 received from the emulation coprocessor controller 250. The emulation coprocessor 240 may also execute or selectively execute subsets of the portion of the emulation instructions for the emulation coprocessor 240 based on one or more synchronization dependencies.

Figure 2C:
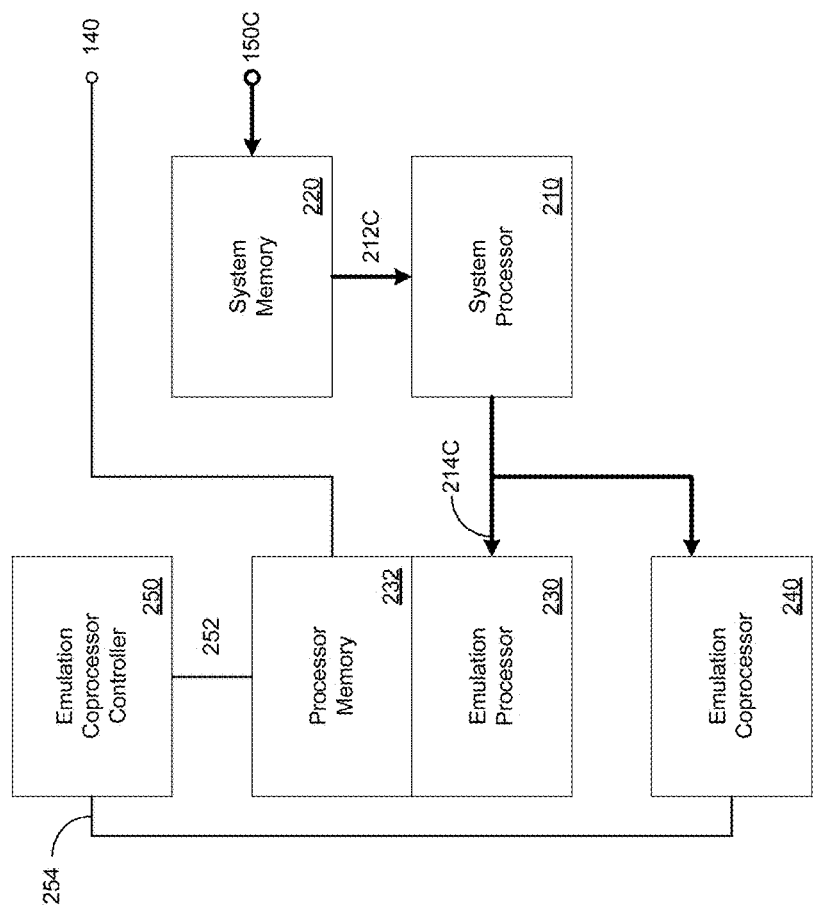
FIG. 2C illustrates the first emulation processor array in a second programming mode, further to FIG. 2A, according to an embodiment.

FIG. 2C illustrates the first emulation processor array in a second programming mode, further to FIG. 2A. As illustrated by way of example in FIG. 2C, an example processor array 200B in a second programming mode may include the system processor 210, the first processor channel in an operating state 212C, the second processor channel in an operating state 214C, the system memory 220, the emulation processor 230, the processor memory 232, the emulation coprocessor 240, the emulation coprocessor controller 250, the first controller channel 252, and the second controller channel 254. The processor array 200B may be operatively coupled with the direct programming communication channel 140 at the processor memory 232, and the system programming communication channel in an operating state 150C at the system memory 220.

The system programming communication channel 150C may transmit one or more emulation instructions associated with one or more of the emulation processor 230 and the emulation coprocessor 240. The system programming communication channel 150C may transmit the emulation instructions for one or more of the emulation processor 230 and the emulation coprocessor 240 to the system memory 220. The emulation instructions transmitted to the system memory 220 may correspond to emulation instructions compatible with execution by the emulation processor 230 and the emulation coprocessor 240. Thus, the system programming communication channel 150C may transmit to the system memory 220 of the processor array 200C emulation instructions for both the emulation processor 230 and the emulation coprocessor 240. The emulation instructions at the system memory 220 may be executable specifically by the particular emulation processor 230 and the emulation coprocessor 240. Thus, the system memory 220 may receive emulation instructions tailored to the emulation processor 230 and the emulation coprocessor 240.

The first processor channel 212C may transmit one or more emulation instructions associated with one or more of the emulation processor 230 and the emulation coprocessor 240. The first processor channel 212C may transmit the emulation instructions for one or more of the emulation processor 230 and the emulation coprocessor 240 to the system processor 210 in response to a retrieval command or the like by the system processor 210. The emulation instructions retrieved by the system processor 210 may correspond to emulation instructions compatible with execution by the emulation processor 230 and the emulation coprocessor 240. Thus, the first processor channel 212C may transmit to the system processor 210 emulation instructions for both the emulation processor 230 and the emulation coprocessor 240.

The second processor channel 214C may transmit one or more emulation instructions associated with one or more of the emulation processor 230 and the emulation coprocessor 240. The second processor channel 214C may transmit the emulation instructions for the emulation processor 230 from the system processor 210 to the emulation processor 230, and may transmit the emulation instructions for the emulation coprocessor 240 from the system processor 210 to the emulation coprocessor 240. The emulation processor 230 may obtain a portion of the emulation instructions associated with the emulation processor 230, and may execute or selectively execute a self-configuration of the devices, registers, caches, and the like, for example, of the emulation processor 230, by executing the portion of the emulation instructions associated with the emulation processor 230 directly from the processor memory 230. Similarly, the emulation coprocessor 240 may obtain a portion of the emulation instructions associated with the emulation coprocessor 240, and may execute or selectively execute a self-configuration of the devices, registers, caches, and the like, for example, of the emulation coprocessor 240, by executing the portion of the emulation instructions associated with the emulation coprocessor 240 received from the system memory 220. It is to be understood that one or more of the emulation processor 230 and the emulation coprocessor 240 may also be operatively coupled with the system memory 220 and may thus retrieve emulation instructions from the system memory 220 directly in response to one or more commands from the system processor 210 to the respective emulation processor 230 and the emulation coprocessor 240 to obtain various emulation instructions.

Figure 3A:
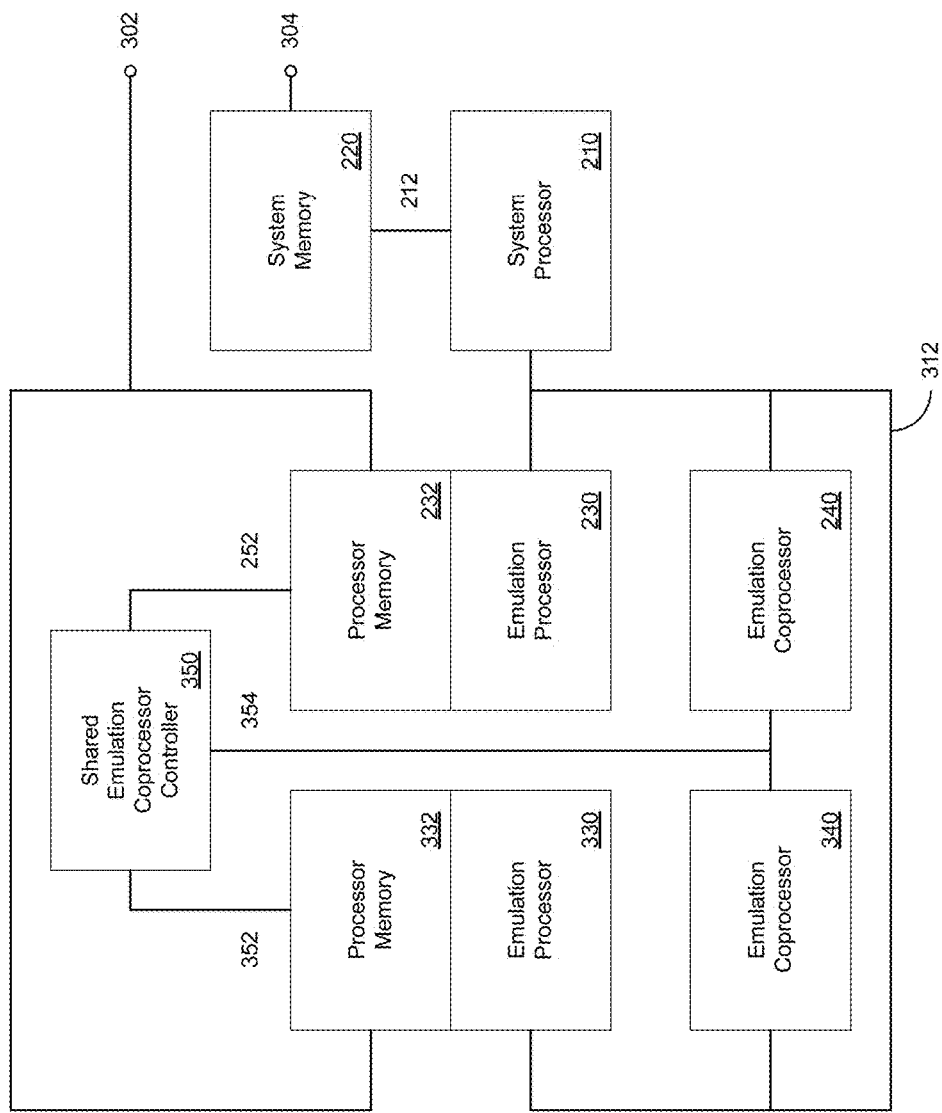
FIG. 3A illustrates a second emulation processor array, according to an embodiment.

FIG. 3A illustrates a second emulation processor array, in accordance with present implementations. As illustrated by way of example in FIG. 3A, an example processor array 300A may include the system processor 210, the first processor channel 212, the system memory 220, the emulation processor 230, the processor memory 232, the emulation coprocessor 240, the first controller channel 252, a second processor channel 312, a second emulation processor 330, a second processor memory 332, a second emulation coprocessor 340, a shared emulation coprocessor controller 350, a second controller channel 352, and a third controller channel 354. The processor array 300A may be operatively coupled with a direct programming communication channel 302 at the processor memory 232 and the second processor memory 332, and a system programming communication channel 304 at the system memory 220. It is to be understood that the processor array 300A may correspond at least partially in one or more of structure and operation to one or more of the processor arrays 200, 202, and 204. The processor arrays 200, 202, and 204 may include a mixture of arrays having configurations corresponding to processor arrays 200A-C and 300A-C.

The direct programming communication channel 302 may correspond at least partially in one or more of structure and operation to the direct programming communication channel 140, and may include one or more channels operatively coupled with the processor memory 232 and the second processor memory 332. The system programming communication channel 304 may correspond at least partially in one or more of structure and operation to the system programming communication channel 150.

The second processor channel 312 may correspond at least partially in one or more of structure and operation to the second processor channel 214, and may include one or more channels operatively coupled with the emulation processor 230, the emulation coprocessor 240, the second emulation processor 330, and the second emulation coprocessor 340. The second emulation processor 330, the second processor memory 332, and the second emulation coprocessor 340 may correspond at least partially in one or more of structure and operation respectively to the emulation processor 230, the processor memory 232, and the second emulation coprocessor 340.

The second controller channel 352 may correspond at least partially in one or more of structure and operation to the first controller channel 252, and may operatively couple the shared emulation coprocessor controller 350 with the processor memory 332. The third controller channel 354 may correspond at least partially in one or more of structure and operation to the second controller channel 254, and may operatively couple the emulation shared coprocessor controller 350 with the emulation coprocessor 240 and the second emulation coprocessor 340.

The shared emulation coprocessor controller 350 may correspond at least partially in one or more of structure and operation to the shared emulation coprocessor controller 250, and may execute one or more instructions associated with the emulation coprocessor 240 and the second the emulation coprocessor 340. The shared emulation coprocessor controller 350 may transmit or selectively transmit, for example, emulation instructions to the emulation coprocessor 240 and the second the emulation coprocessor 340. The emulation coprocessor controller 250 may transmit emulation instructions to the emulation coprocessor 240 associated specifically with the emulation coprocessor 240, and transmit emulation instructions to the second emulation coprocessor 340 associated specifically with the second emulation coprocessor 340. Thus, the shared emulation coprocessor controller 350 may advantageously transmit emulation coprocessor instruction to multiple emulation coprocessors 240 and 240 from multiple processor arrays 232 and 332 of multiple emulation processors 230 and 330. As a result, the processor array 300A may achieve substantial reductions in cost and size by reducing the number of emulation coprocessor controllers required to rapidly transmit emulation instructions to a large number of emulation coprocessors. It is to be understood that the shared emulation coprocessor controller 350 may support more than two emulation coprocessors at least in accordance with the structure of processor array 300A.

Figure 3B:
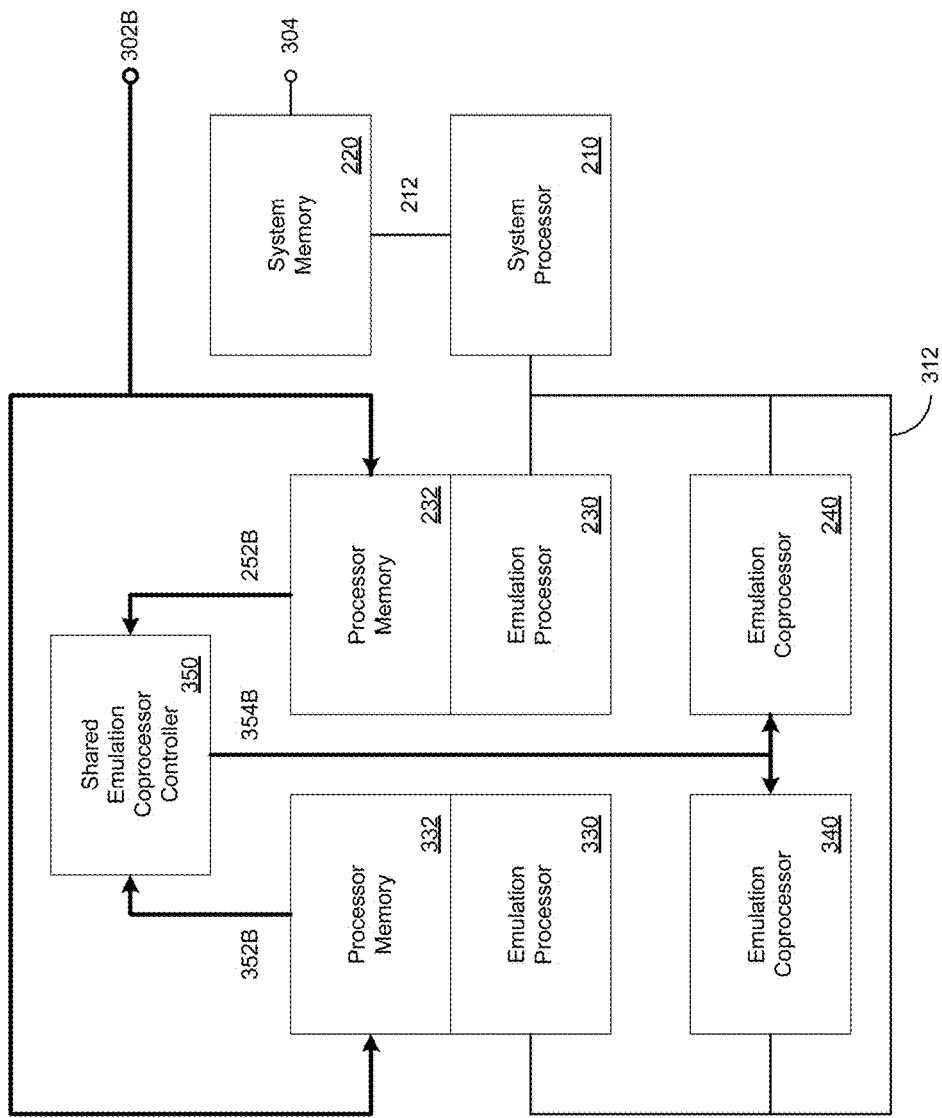
FIG. 3B illustrates the second emulation processor array in a first programming mode, further to FIG. 3A, according to an embodiment.

FIG. 3B illustrates the second emulation processor array in a first programming mode, further to FIG. 3A. As illustrated by way of example in FIG. 3B, an example processor array 300B may include the system processor 210, the first processor channel 212, the system memory 220, the emulation processor 230, the processor memory 232, the emulation coprocessor 240, the first controller channel 252B in an operating state, the second processor channel 312, the second emulation processor 330, the second processor memory 332, the second emulation coprocessor 340, the shared emulation coprocessor controller 350, the second controller channel 352B in an operating state, and the third controller channel 354B in an operating state. The processor array 300B may be operatively coupled with the direct programming communication channel in an operating state 302B at the processor memory 232 and the second processor memory 332, and the system programming communication channel 304 at the system memory 220.

The direct programming communication channel 302B may transmit one or more emulation instructions associated with one or more of the emulation processors 230 and 330, and the emulation coprocessors 240 and 340. The direct programming communication channel 302B may transmit the emulation instructions for the emulation processor 230 and the emulation coprocessor 240 to the processor memory 232, and may transmit the emulation instructions for the emulation processor 330 and the emulation coprocessor 340 to the processor memory 332. The direct programming communication channel 302B may include dedicated channels or sub channels, for example, each corresponding respectively to one of the processor memory 232 and the processor memory 332. Thus, the direct programming communication channel 302B may concurrently provide emulation instructions for multiple emulation processors and emulation coprocessors to multiple emulation processors.

The first controller channel 252B may transmit a portion of emulation instructions associated with the emulation coprocessor 240, in accordance with the operation of processor array 200B. The second controller channel 352B may correspond at least partially in one or more of structure and operation to the first controller channel 252B, and may transmit a portion of emulation instructions associated with the second emulation coprocessor 340. Thus, each of the emulation coprocessor 240 and the second emulation coprocessor 340 may respectively and concurrently obtain their emulation instructions respectively by the first controller channel 252B and the second controller channel 352B.

The third controller channel 354B may transmit the emulation instructions associated with the emulation coprocessor 240 and the second emulation coprocessor 340. The second controller channel 254B may transmit the emulation instructions for the emulation coprocessor 240 to the emulation coprocessor 240. The shared emulation coprocessor controller 350 may transmit a portion of the emulation instructions associated with the emulation coprocessor 240 to that coprocessor and may transmit a portion of the emulation instructions associated with the second emulation coprocessor 340 to that coprocessor.

Each of the emulation coprocessors 240 and 340 may execute their won parallel self-configuration of their respective devices, registers, caches, and the like, for example, by executing their portion of the emulation instructions received from the shared emulation coprocessor controller 350. Each of the emulation coprocessors 240 and 340 may also execute or selectively execute subsets of their portions of the emulation instructions based on one or more synchronization dependencies of the emulation processors 230 and 330.

Figure 3C:
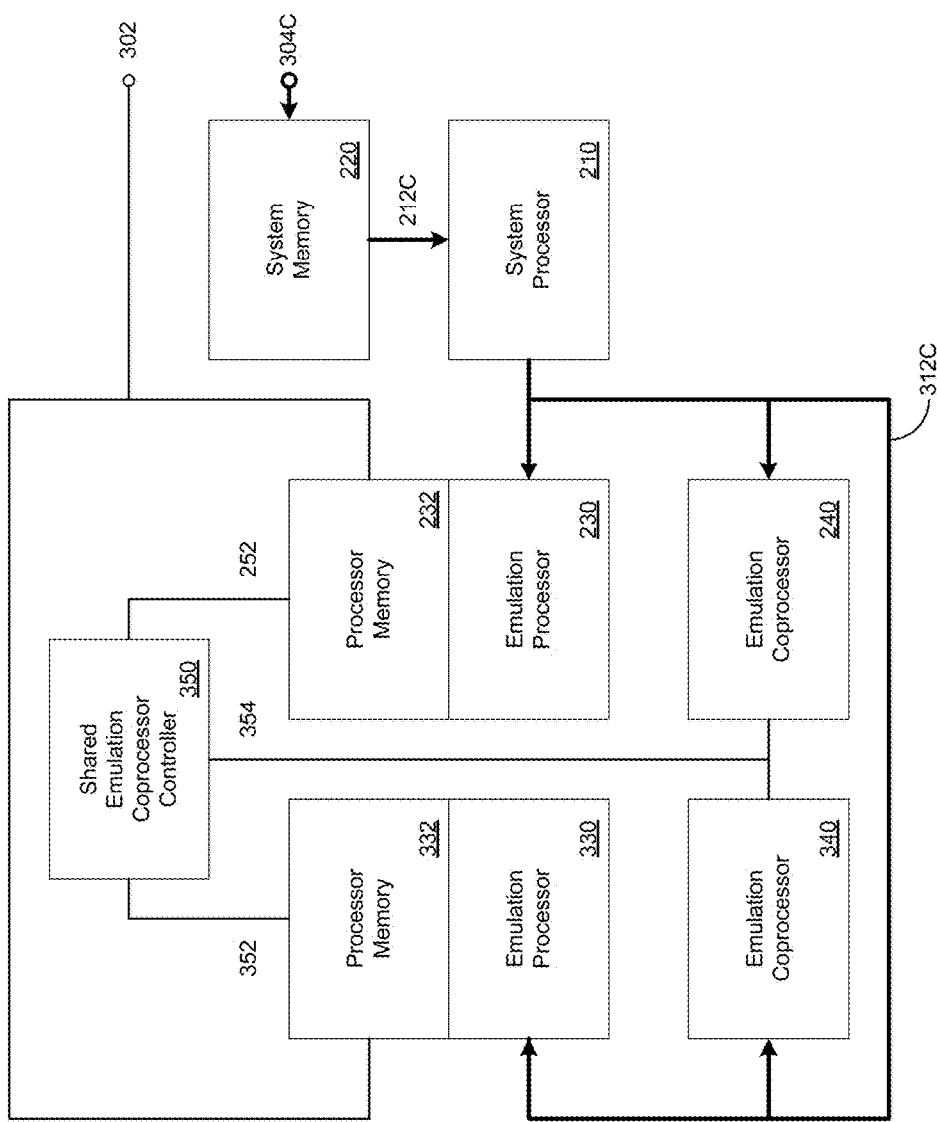
FIG. 3C illustrates the second emulation processor array in a second programming mode, further to FIG. 3A, according to an embodiment.

FIG. 3C illustrates the second emulation processor array in a second programming mode, further to FIG. 3A. As illustrated by way of example in FIG. 3C, an example processor array 300C may include the system processor 210, the first processor channel 212C in an operating state, the system memory 220, the emulation processor 230, the processor memory 232, the emulation coprocessor 240, the first controller channel 252, the second processor channel 312C in an operating state, the second emulation processor 330, the second processor memory 332, the second emulation coprocessor 340, the shared emulation coprocessor controller 350, the second controller channel 352B in an operating state, and the third controller channel 354B in an operating state. The processor array 300C may be operatively coupled with the direct programming communication channel 302 at the processor memory 232 and the second processor memory 332, and the system programming communication channel 304C in an operating state at the system memory 220.

The system programming communication channel 304C may transmit one or more emulation instructions associated with one or more of the emulation processor 230 and the emulation coprocessor 240, and may correspond at least partially in one or more of structure and operation to the system programming communication channel 150C. The first processor channel 212C may correspond at least partially in one or more of structure and operation to the first processor channel 212C of the processor array 200C, and may transmit emulation instructions for one or more of the emulation processors 230 and 330, and the emulation coprocessors 240 and 340.

The second processor channel 312C may transmit one or more emulation instructions associated with one or more of the emulation processors 230 and 330, and the emulation coprocessors 240 and 340. The second processor channel 312C may transmit the emulation instructions for the emulation processors 230 and 330 from the system processor 210 to the emulation processors 230 and 330, and may transmit the emulation instructions for the emulation coprocessors 240 and 340 from the system processor 210 to the emulation coprocessors 240 and 340. The emulation processors 230 and 330 may each obtain their respective portions of the emulation instructions, and may execute or selectively execute parallel and concurrent self-configuration of the devices, registers, caches, and the like, for example, respectively of the emulation processors 230 and 330, by executing their respective portions of the emulation instructions. Similarly, the emulation coprocessors 240 and 340 may obtain their respective portions of the emulation instructions, and may execute or selectively execute parallel and concurrent self-configuration of the devices, registers, caches, and the like, for example, by executing their respective portion of the emulation instructions received from the system memory 220. It is to be understood that one or more of the emulation processors 230 and 330 and the emulation coprocessors 240 and 340 may also be operatively coupled with the system memory 220 and may thus retrieve emulation instructions from the system memory 220 directly in response to one or more commands from the system processor 210 to the respective emulation processors 230 and 330, and the emulation coprocessors 240 and 340 to obtain various emulation instructions.

Figure 4:
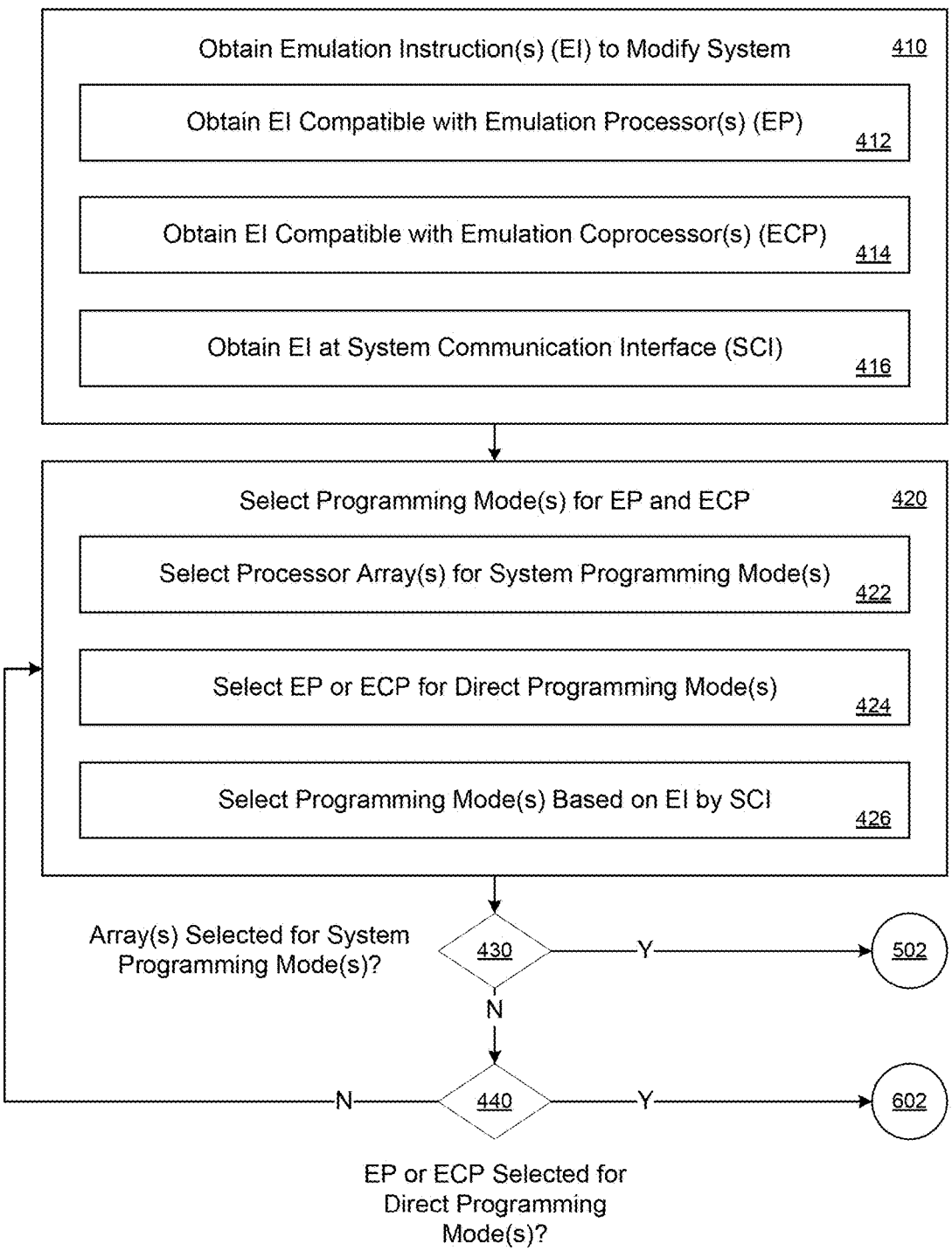
FIG. 4 illustrates a method of accelerated modification of an emulation processor system, according to an embodiment.

FIG. 4 illustrates a method of accelerated modification of an emulation processor system, in accordance with present implementations. The system 110 may perform method 400 according to present implementations. The method 400 begins at step 410.

At step 410, the system may obtain one or more emulation instructions to modify an emulation system. The system may obtain emulation instructions by the communication interfaces 124 and 130 from the compiler 122. The number of emulation processors and coprocessors may number into the thousands or more, in order to achieve hardware-based emulation of computing devices of sufficient complexity. Thus, the emulation instructions may be transmitted to the system 110 and may include emulation instructions for an arbitrary number of emulation processors and coprocessors to significantly increase the speed of programming of those emulation processors and coprocessors. Step 410 may include at least one of steps 412, 414 and 416. At step 412, the system may obtain emulation instructions compatible with emulation processors. The emulation instructions may be in a format executable by one or more of the emulation processors 230 and 240, or the emulation coprocessors 240 and 340. As one example, the emulation instructions may include at least a first portion of emulation instructions in machine code executable by the emulation processor 230 and a second portion in machine code executable by the emulation coprocessor 240. The emulation instructions may implement a state machine or preprogrammed hardware routine at the system 110. The state machine or hardware routine may perform the operations as specified by the emulation instructions. At step 414, the system may obtain emulation instructions compatible with emulation coprocessors. At step 416, the system may obtain emulation instructions at a system communication interface. The system communication interface may correspond to the system communication interface 130. The method 400 then continues to step 420.

At step 420, the system may select a programming mode for the emulation processors and the emulation coprocessors. The system processor may select a programming mode for one or more processors arrays 200, 202, and 240, and for one or more emulation processors and one or more emulation coprocessors. Step 420 may include at least one of steps 422, 424 and 426. At step 422, the system selects one or more processor arrays for a system programming mode. In the system programming mode, emulation processors and emulation coprocessors may be programmed in accordance with one or more of processor arrays 200C and 300C. At step 424, the system may select one or more emulation processors or emulation coprocessors for a direct programming mode. In the direct programming mode, emulation processors and emulation coprocessors may be programmed in accordance with one or more of processor arrays 200B and 300B. The system 110 may select various processor arrays to be programming in either direct programming mode or system programming mode in any combination or permutation. As one example, the system 110 may select direct or system programming modes on a logic board level, by instructing all processor arrays and their included emulation processors and emulation coprocessors to be programmed in either a direct programming mode or an indirect programming mode. At step 426, the system select programming modes based on emulation instructions received by the system communication interface. As one example, the emulation instructions may indicate a particular number or identified set of logic boards or processor arrays to be programmed in either the direct programming mode or the system programming mode. Criteria to select which components of the system 100 are programming in which mode may include, but are not limited to, dependencies or conditions for executing various instructions, or synchronization of execution of various emulation instructions across processors, coprocessors, processor arrays, logic boards, or the like. The method 400 then continues to step 430.

At step 430, the system determines whether one or more processor arrays are selected for a system programming mode. In accordance with a determination that one or more processor arrays are selected for a system programming mode, the method 400 continues to step 502. Alternatively, in accordance with a determination that no processor arrays are selected for a system programming mode, the method 400 continues to step 440.

The system may execute parallelized and concurrent programming of many emulation processors, emulation coprocessors, and logic boards, for example. Thus, the system may execute the determinations of steps 430 and 440 independently and concurrently with respect to each processor array, emulation processor, and emulation coprocessor. At step 440, the system determines whether one or more processor arrays, emulation processors, or emulation coprocessors are selected for a direct programming mode. In accordance with a determination that one or more processor arrays, emulation processors, or emulation coprocessors are selected for a direct programming mode, the method 400 continues to step 602. Alternatively, in accordance with a determination that no processor arrays, emulation processors, or emulation coprocessors are selected for a direct programming mode, the method 400 continues to step 420.

Figure 5:
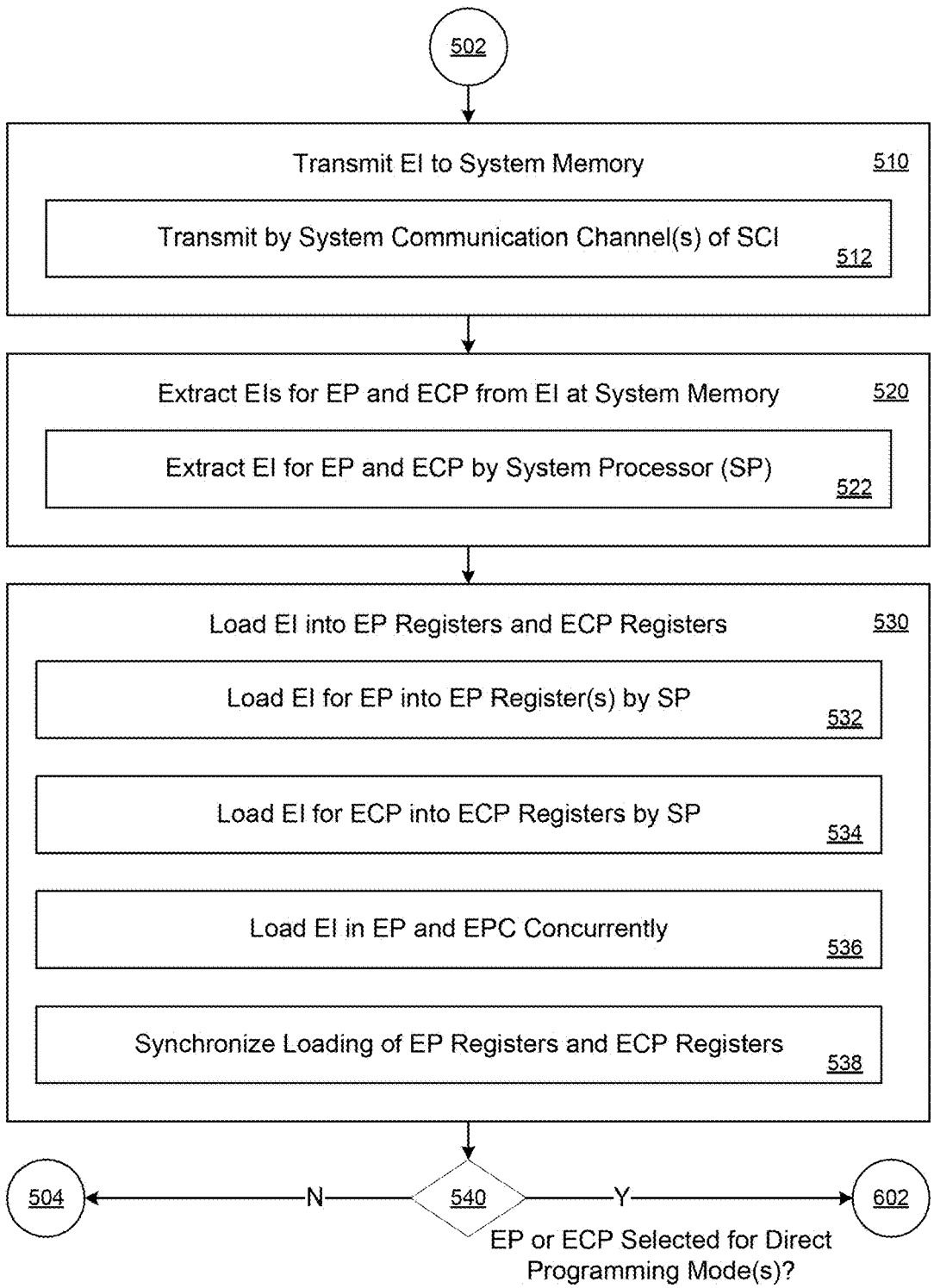
FIG. 5 illustrates a method of accelerated modification of an emulation processor system further to the method of FIG. 4, according to an embodiment.

FIG. 5 illustrates a method of accelerated modification of an emulation processor system further to the method of FIG. 4. The system 110 may perform method 500 according to present implementations. The method 500 may correspond to a system programming mode, and may be executed in parallel and concurrently by each processor array of the system 110. The method 500 begins at step 502. The method 500 then continues to step 510.

At step 510, the system may transmit emulation instructions to a system memory. The system may transmit emulation instructions corresponding to any number of or all of the emulation processors and emulation coprocessors in a single transmission. Thus, the system may efficiently transmit machine code corresponding to a large number of emulation processors in a single step, reducing or eliminating transmission delays caused by partial or sequential transmission of emulation instructions for subsets of emulation processors, emulation coprocessor, or processor arrays. Step 510 may include step 512. At step 512, the system may transmit the emulation instruction by one or more system communication channels of the system communication interface. The system communication channel may include the system programming channels 150, 152 and 154. The method 500 then continues to step 520.

At step 520, the system extracts emulation instructions and emulation coprocessor instructions from the emulation instructions at the system memory. The emulation instructions may include identifiers or the like to associate various portions of the emulation instructions with particular individual emulation processor and emulation coprocessors within a particular processor array or across the system 110. Step 520 may include step 522. At step 522, the system may extract emulation instructions for emulation processors and emulation coprocessors or a processor array by the system processor of that processor array. The system processor may extract the emulation instructions based on the identifiers or the like, for example. The method 500 then continues to step 530.

At step 530, the system may load emulation instructions into registers of emulation processor and emulation coprocessors. The system processor may load the emulation instructions to the various emulation processors and emulation coprocessors, or the system processor may instruction or direct the emulation processor and the emulation coprocessors to self-load and self-configure. It is to be understood that loading is not limited to registers, and may include any component of any emulation processor or emulation coprocessor, including but not limited to registers, memories, caches, accumulators, and the like, for example. Step 530 may include at least one of steps 532, 534, 536 and 538. At step 532, the system may load emulation instructions for emulation processors into emulation processor registers by the system processor. At step 534, the system may load emulation instructions for emulation coprocessors into emulation coprocessor registers by the system processor. At step 536, the system may concurrently load emulation instructions for emulation processors into emulation processor registers and loads emulation instructions for emulation coprocessors into emulation coprocessor registers by the system processor. Concurrent loading may include parallelized loading. At step 538, the system may synchronize loading of emulation processor registers and emulation coprocessor registers. Synchronization may include loading various emulation instructions or executing various emulation instructions in a particular order across emulation processors. The order may be based on various dependencies or conditions of the emulation instructions, or various processing sequences required to execute various emulation instructions at a particular emulation processor, emulation coprocessor, processor array, or any combination thereof. As one example, synchronization may include loading emulation instructions onto an emulation processor in a particular configuration state before loading various instructions onto an emulation coprocessor paired with the emulation processor, where the loading of instructions on the emulation coprocessor depends on the configuration state of its paired emulation processor. The method 500 then continues to step 540.

At step 540, the system determines whether one or more processor arrays, emulation processors, or emulation coprocessors are selected for a direct programming mode. In accordance with a determination that one or more processor arrays, emulation processors, or emulation coprocessors are selected for a direct programming mode, the method 500 continues to step 602. Alternatively, in accordance with a determination that no processor arrays, emulation processors, or emulation coprocessors are selected for a direct programming mode, the method 500 continues to step 504. In some implementations, the method 500 ends at step 504.

Figure 6:
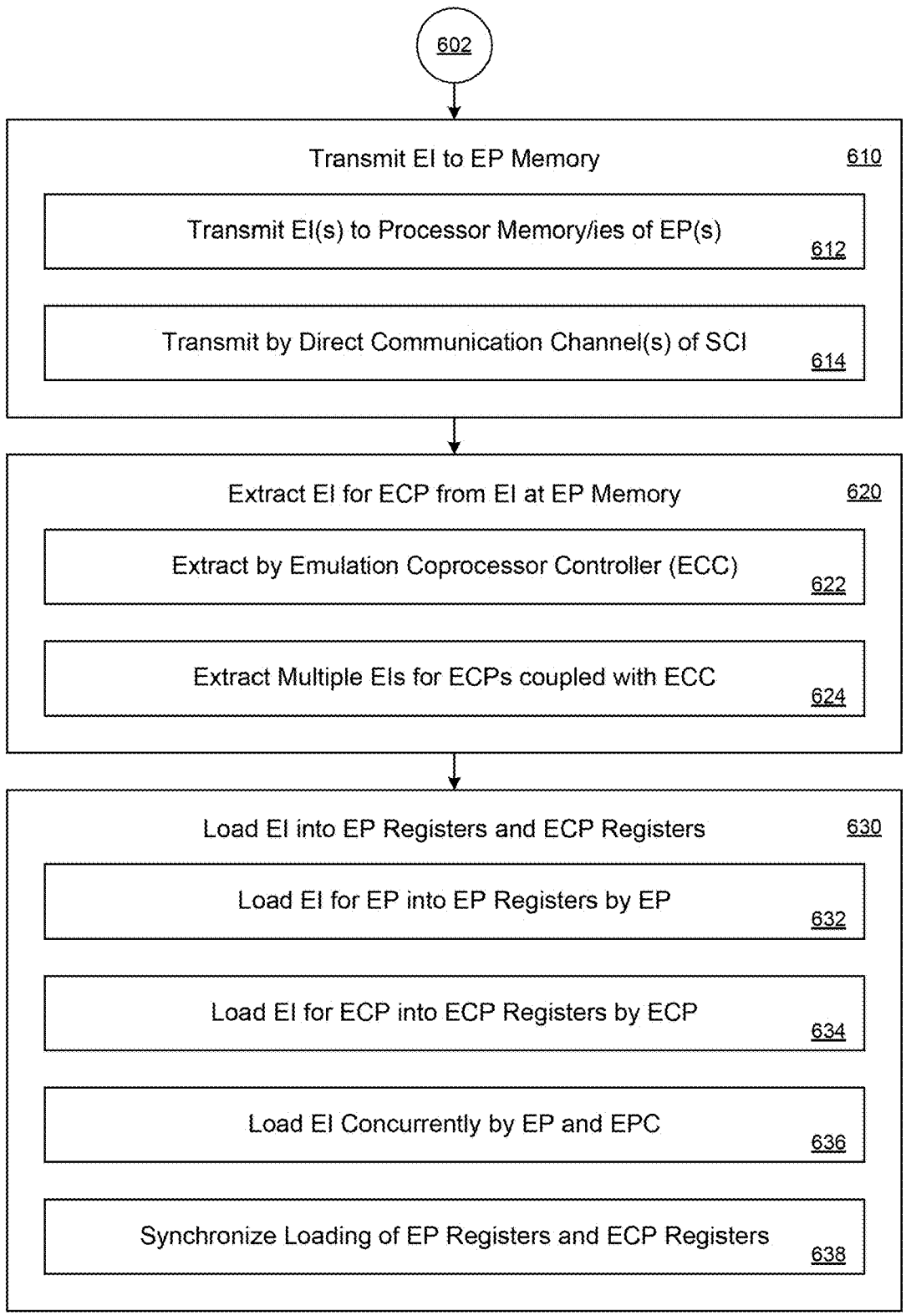
FIG. 6 illustrates a method of accelerated modification of an emulation processor system further to the method of FIG. 5, according to an embodiment.

FIG. 6 illustrates a method of accelerated modification of an emulation processor system further to the method of FIG. 5. The system 110 may perform method 600 according to present implementations. The method 600 may correspond to a direct programming mode, and may be executed in parallel and concurrently by each emulation processor, emulation coprocessor, and processor array of the system 110. The method 600 begins at step 602. The method 600 then continues to step 610.

At step 610, the system may transmit emulation instructions to processor memory of an emulation processor. The system may transmit emulation instructions for particular emulation processors and their associated or paired emulation coprocessors to each emulation processor. Step 610 may include at least one of steps 612 and 622. At step 612, the system transmits emulation instructions to processor memories of particular emulation processors. The emulation instructions transmitted to the processor memories may be portions of bulk transferred emulation instructions associated with particular emulation processors and their paired or corresponding emulation coprocessors. At step 614, the system transmits the emulation instructions by one or more direct communication channels of the system communication interface. The system may transmit the emulation instructions to each processor memory concurrently or in parallel to advantageously execute a bulk transfer of emulation instructions directly to any number or emulation processors coupled with a direct communication channel of a system communication interface. The direct communication channel may include the direct programming communication channels 140, 142 and 144. The method 600 then continues to step 620.

At step 620, the system extracts emulation instructions for emulation coprocessors from the emulation instructions at the processor memory of the emulation processor. The emulation coprocessor paired with or corresponding to the emulation processor may extract the emulation instructions associated with that emulation coprocessor from the processor memory of its corresponding or paired emulation processor. Step 620 may include at least one of steps 622 and 624. At step 622, the system extracts the emulation instructions by the emulation coprocessor controller. The emulation coprocessor controller may include the emulation coprocessor controller 250 or the shared emulation coprocessor controller 350. At step 624, the system extracts multiple emulation instructions for emulation coprocessors coupled with the emulation coprocessor controller. The emulation coprocessor controller corresponding to the emulation processor may extract the emulation instructions associated with that emulation coprocessor or coprocessors from the processor memory of its corresponding emulation processor, in accordance with one or more of processor arrays 200B and 300B. The method 600 then continues to step 630.

At step 630, the system may self-load emulation instructions into registers of emulation processors and emulation coprocessors. The emulation processors and emulation coprocessors may self-load the emulation instructions. It is to be understood that loading is not limited to registers, and may include any component of any emulation processor or emulation coprocessor, including but not limited to registers, memories, caches, accumulators, and the like, for example. Step 630 may include at least one of steps 632, 634, 636 and 638. At step 632, emulation processors may self-load emulation instructions into emulation processor registers. At step 634, emulation coprocessors may self-load emulation instructions into emulation coprocessor registers. At step 636, emulation processors may concurrently self-load emulation instructions into emulation processor registers and emulation coprocessors may self-load emulation instructions into emulation coprocessor registers, in accordance with the processor arrays 200B and 300B. Concurrent loading may include parallelized loading. At step 638, the system may synchronize loading of emulation processor registers and emulation coprocessor registers. Synchronization may correspond at least partially in one or more of structure and operation to synchronization of step 538. The method 600 ends at step 630.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A method of accelerated modification of an emulation processor system, comprising:
   loading, a portion of data to a memory of a first emulation processor, wherein the data contains information about a list of sequential updates to one or more hardware states of the first emulation processor and an embedded controller in the first emulation processor which takes the above data and performs corresponding updates to remaining states or registers of the first emulation processor;
   loading, in parallel, a second portion of the data to a memory of a second emulation processor operatively coupled with the first emulation processor, wherein the data contains information about a list of sequential updates to the hardware states of the second emulation processor, and an embedded controller in the second emulation processor which takes the second portion of the data and performs the corresponding updates to remaining states or registers of the second emulation processor; and
   loading, in parallel, a third portion of the data to the memory of other emulation processors of the emulation processor system that contains embedded controllers performing their own state updates.

2. The method of claim 1, wherein the portions of the data for each of the emulation processors can contain information to extract specific states or register values from the corresponding emulation processor, which is performed by the embedded controller, and subsequent updates contained in a respective one of the portions of the data can depend on conditional or logical evaluation of extracted results.

3. The method of claim 2, further comprising:
   loading a portion of data to a memory of a processor or controller operatively coupled with the first, second or other emulation processors of the emulation system, wherein the processor or controller uses the information contained in the portion of data to update states or register values of a different processor operable at least in emulation or communication, that is operatively coupled with or integrated in the emulation system.

4. The method of claim 2, further comprising:
   loading, a fourth portion of the data to a memory of a system processor or system controller that is not operatively coupled with any of the first, second or other emulation processors of the same emulation system, wherein the system processor or system controller will use the information contained in the fourth portion of data to update states or register values of a different processor operable at least in emulation or communication, that is operatively coupled with the first, second or other emulation processors in the emulation system.

5. The method of claim 1, further comprising:
   dividing a corresponding portion of the data for each of the processors into sequential blocks, wherein all blocks are loaded together to respective processors, the blocks being processed by the embedded controller in sequential order, and at the end of each block, processors or controllers wait for all other operatively coupled processors or controllers to reach the end of the respective block of their own, which is a synchronization point.

6. The method of claim 5, further comprising:
   operating an emulation host computer that initiates the loading of data to emulation processors as a master to confirm the synchronization at the end of the blocks for all operatively coupled processors; and
   broadcasting by the emulation host computer a message to all operatively coupled processors to process the subsequent block.

7. The method of claim 1, further comprising:
   generating the portions of the data for all operatively coupled emulation processors of this emulation job by the compiler during compile time, and not during runtime.

8. An apparatus associated with an emulation processor system, the apparatus comprising:
   a first emulation processor including one or more first registers and operable to load a first portion of processor instructions into the first registers, in response to a selection of a first programming mode associated with the first emulation processor; and
   a second emulation processor operatively coupled with the first emulation processor and including one or more second registers, the second emulation processor being operable to load a second portion of the processor instructions into the second registers, in response to a selection of a first programming mode associated with the second emulation processor.

9. The apparatus of claim 8, further comprising:
   a controller operatively coupled with the second emulation processor and operable to extract the second portion of the processor instructions from a first processor memory of the first emulation processor, in response to the selection of the first programming mode associated with the second emulation processor.

10. The apparatus of claim 9, further comprising:
   a third emulation processor including a second processor memory and operatively coupled with the controller, wherein the controller is further operable to extract a third portion of the processor instructions from the second processor memory, in response to a selection of a first programming mode associated with the third emulation processor.

11. The apparatus of claim 10, further comprising:
a fourth emulation processor including one or more third registers and operatively coupled with the third emulation processor, the fourth emulation processor being operable to load the third portion of the processor instructions into the third registers, in response to a selection of a first programming mode associated with the fourth emulation processor.

12. The apparatus of claim 9, further comprising:
a communication interface including a first communication channel and operatively coupled to the first emulation processor, the communication interface operable to transmit the processor instructions to the first processor memory by the first communication channel.

13. The apparatus of claim 8, further comprising:
a system processor operatively coupled with at least one of the first emulation processor and the second emulation processor, and operable to load at least the first portion of the processor instructions into the first registers, in response to a selection of a second programming mode associated with the first emulation processor.

14. The apparatus of claim 13, wherein the system processor is further operable to load at least the second portion of the processor instructions into the registers of the second emulation processor, in response to a selection of a second programming mode associated with the second emulation processor.

15. The apparatus of claim 8, wherein the first emulation processor and the second emulation processor are further configured to synchronize, based on a dependency of the second portion of processor instructions on the first portion of processor instruction, an order of the loading the first portion of processor instructions and the loading the second portion of processor instructions.

16. A system of accelerated modification of an emulation processor system, comprising:
a first emulation processor including one or more first registers and operable to load a first portion of processor instructions into the first registers, in response to a selection of a first programming mode associated with the first emulation processor;
a second emulation processor operatively coupled with the first emulation processor and including one or more second registers, the second emulation processor being operable to load a second portion of the processor instructions into the second registers, in response to a selection of a first programming mode associated with the second emulation processor;
a controller operatively coupled with the second emulation processor and operable to extract the second portion of the processor instructions from a first processor memory of the first emulation processor, in response to the selection of the first programming mode associated with the second emulation processor; and
a system processor operatively coupled with at least one of the first emulation processor and the second emulation processor, operable to load at least the first portion of the processor instructions into the first registers, in response to a selection of a second programming mode associated with the first emulation processor, and operable to load at least the second portion of the processor instructions into the registers of the second emulation processor, in response to a selection of a second programming mode associated with the second emulation processor.

17. The system of claim 16, further comprising:
a system memory operatively coupled with the system processor; and
a communication interface including a first communication channel and a second communication channel, and operatively coupled to the first emulation processor, the system processor, and the system memory.

18. The system of claim 17, wherein the communication interface is operable to transmit the processor instructions to the first processor memory by the first communication channel, in response to the selection of the first programming mode associated with the first emulation processor, and
the communication interface is operable to transmit the processor instructions to the system memory by the second communication channel, in response to the selection of the second programming mode associated with the first emulation processor.

* * * * *